(12) United States Patent
Miyamura et al.

(10) Patent No.: US 9,934,816 B1
(45) Date of Patent: Apr. 3, 2018

(54) AVOIDING DEBRIS ACCUMULATION ON TAPE DRIVE

(71) Applicant: International Business Machines Corporation, Armonk, NY (US)

(72) Inventors: Tsuyoshi Miyamura, Tokyo (JP); Eiji Ogura, Tokyo (JP); Tomoko Taketomi, Tokyo (JP); Kazuhiro Tsuruta, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/425,062

(22) Filed: Feb. 6, 2017

(51) Int. Cl.
*G11B 20/10* (2006.01)
*G11B 5/008* (2006.01)
*G11B 15/44* (2006.01)

(52) U.S. Cl.
CPC .... *G11B 20/10472* (2013.01); *G11B 5/00813* (2013.01); *G11B 15/444* (2013.01)

(58) Field of Classification Search
None
See application file for complete search history.

(56) References Cited

U.S. PATENT DOCUMENTS

| 5,436,774 | A | * | 7/1995 | Nakagawara | ...... G11B 5/00813 360/53 |
| 6,690,535 | B2 | * | 2/2004 | Wang | ...... G11B 5/584 360/25 |
| 6,775,086 | B1 | | 8/2004 | Kobayashi et al. | |
| 7,085,091 | B1 | | 8/2006 | Kientz | |
| 7,835,103 | B2 | | 11/2010 | Anderson et al. | |
| 8,773,805 | B2 | * | 7/2014 | Argumedo | ............. G11B 15/48 360/31 |

* cited by examiner

*Primary Examiner* — K. Wong
(74) *Attorney, Agent, or Firm* — Kunzler PC (57) ABSTRACT

For avoiding debris accumulation on a tape drive, a processor records a position error signal (PES) value and cumulative head turnaround count for each region of a plurality of regions of a magnetic tape. The processor further selects a first region in which to reverse travel of the magnetic tape relative to a tape head. In response to determining one of the PES value for the first region does not exceed a PES threshold and the cumulative head turnaround count for the first region does not exceed a count threshold, the processor reverses travel of the magnetic tape at the first region. In response to determining the PES value for the first region exceeds the PES threshold and the cumulative head turnaround count for the first region exceeds the count threshold, the processor selects a second region at which to reverse travel of the magnetic tape.

17 Claims, 10 Drawing Sheets

AVOIDING DEBRIS ACCUMULATION ON TAPE DRIVE

FIELD

The subject matter disclosed herein relates to tape drives and more particularly relates to avoiding debris accumulation on tape drives.

BACKGROUND

A tape head may generate debris that is deposited on a magnetic tape.

BRIEF SUMMARY

An apparatus for avoiding debris accumulation on a tape drive is disclosed. The apparatus includes a processor and a memory storing code executable by the processor. The processor records a position error signal (PES) value and cumulative head turnaround count for each region of a plurality of regions of a magnetic tape. The processor further selects a first region in which to reverse travel of the magnetic tape relative to a tape head. In response to determining one of the PES value for the first region does not exceed a PES threshold and the cumulative head turnaround count for the first region does not exceed a count threshold, the processor reverses travel of the magnetic tape at the first region. In response to determining the PES value for the first region exceeds the PES threshold and the cumulative head turnaround count for the first region exceeds the count threshold, the processor selects a second region at which to reverse travel of the magnetic tape. A method and computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the tape drives that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

Figure 1A:
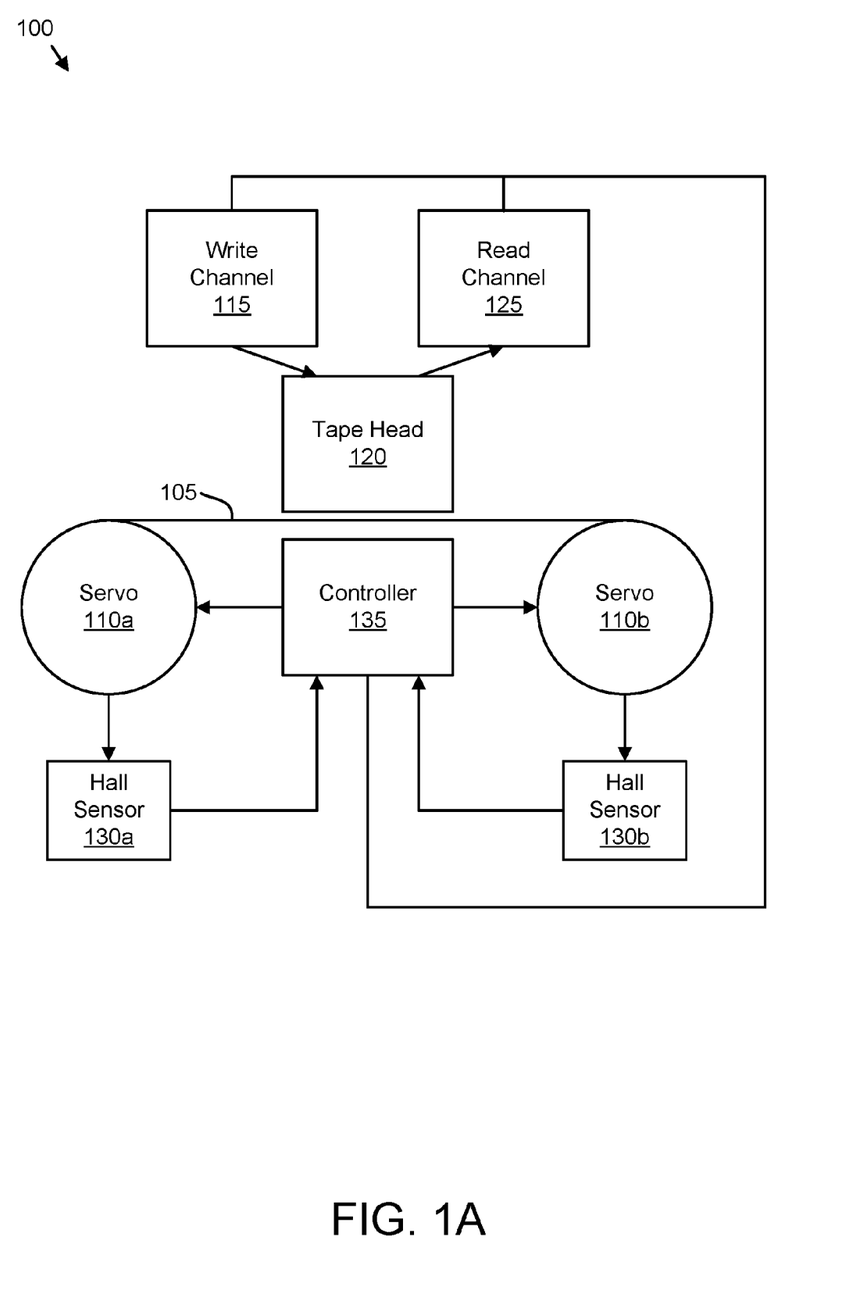
FIG. 1A is a schematic block diagram illustrating one embodiment of a tape drive.

FIG. 1A is a schematic block diagram illustrating one embodiment of a tape drive 100. The tape drive 100 may write data to and read data from a magnetic tape 105. In the depicted embodiment, the tape drive 100 includes a write channel 115, a read channel 125, a tape head 120, the magnetic tape 105, one or more servos 110, one or more hall sensors 130, and a controller 135.

The servos 110 may transport the magnetic tape 105 in one of two directions. The controller 135 may control the servos 110 using information from the hall sensors 130. The controller 135 may further communicate the data through the write channel 115 to the tape head 120 and the tape head 120 writes the data to the magnetic tape 105. In addition, the tape head 120 may read the data from the magnetic tape 105 and communicate the data through the read channel 125 to the controller 135.

In one embodiment, the tape head 120 continuously determines a position error signal (PES) value. The PES value may be calculated as a position difference between the tape head 120 and one or more tracks on the magnetic tape 105. In one embodiment, the PES value is a PES standard deviation. Alternatively, the PES value may be a PES variance. In a certain embodiment, the PES value is an absolute difference.

The tape head 120 may fly just above the magnetic tape 105. In addition, the tape head 120 may accumulate debris from the magnetic tape 105. When the magnetic tape 105 reverses direction, the debris may be deposited at a turnaround position on the magnetic tape 105. When the tape drive 100 is performing long continuous backup operations to the magnetic tape 105, the turnaround positions may be positioned outside of data regions and calibration areas so that the effect of the debris in the turnaround positions is minimal. However, when the travel direction of the magnetic tape 105 is reversed mid tape, the debris may be deposited in a data region, hereinafter referred to as a region, of the magnetic tape 105.

The embodiments described herein determine regions and turnaround positions within the regions for reversing the travel of the magnetic tape 105 relative to the tape head 120 that avoid debris accumulation. In a certain embodiment, the debris accumulation for a turnaround position is limited to a single travel reversal, thus minimizing the effects of the debris on the performance of the magnetic tape at the turnaround position as will be described hereafter.

Figure 1B:
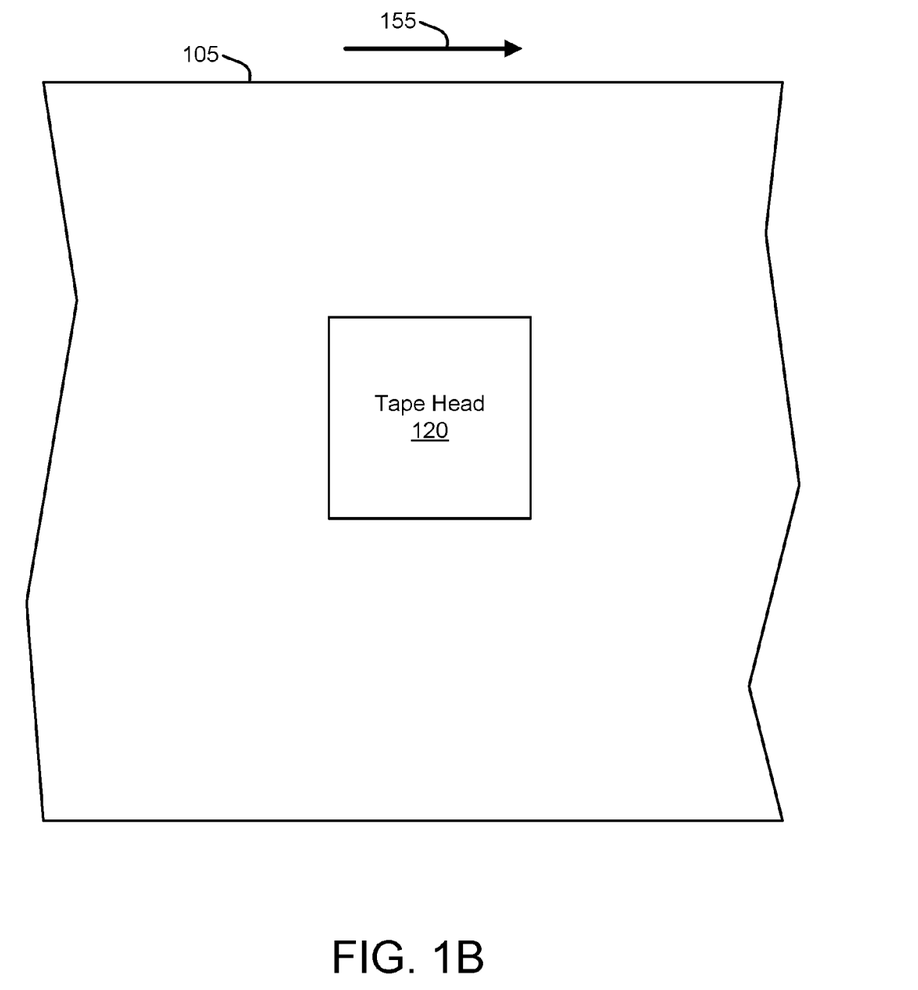
FIG. 1B is a drawing illustrating one embodiment of a tape head on a magnetic tape.

FIG. 1B is a drawing illustrating one embodiment of the tape head 120 on the magnetic tape 120. The tape head 120 may fly over a portion of the magnetic tape 105 in a travel direction 155. The travel direction 155 may be reversed.

Figure 1C:
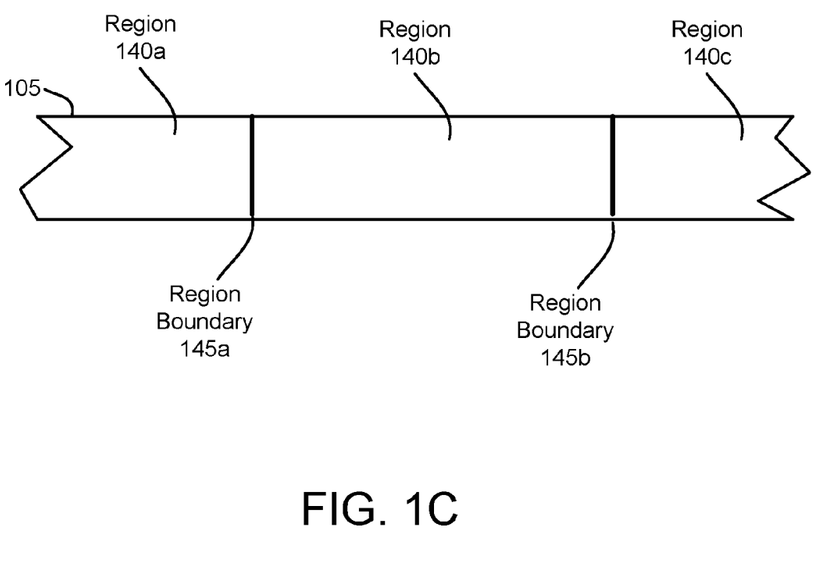
FIG. 1C is a drawing illustrating one embodiment of a magnetic tape.

FIG. 1C is a drawing illustrating one embodiment of the magnetic tape 105. In the depicted embodiment, the magnetic tape 105 is divided into a plurality of regions 140 by a plurality of region boundaries 145. In one embodiment, the tape drive 100 may detect the region boundaries 145. In addition, the tape drive 100 may maintain a region pointer that indicates the region 140 over which the tape head 120 is positioned.

Figure 2A:
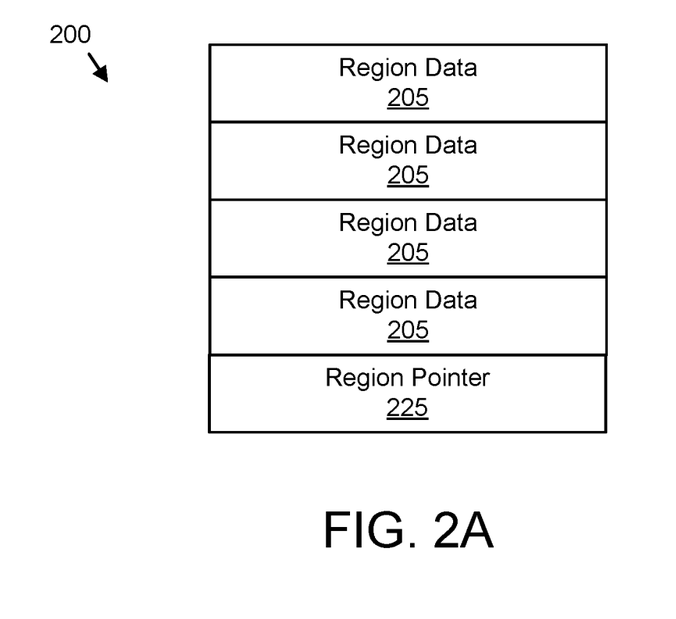
FIG. 2A is a schematic block diagram illustrating one embodiment of tape data.

FIG. 2A is a schematic block diagram illustrating one embodiment of tape data 200. The tape data 200 may be organized as a data structure in a memory of the controller 135. In the depicted embodiment, the tape data 200 includes region data 205 for each region 140 of the magnetic tape 105. In addition, the tape data 200 may include a region pointer N 225 to the current region 140 over which the tape head 120 is positioned. In one embodiment, the region pointer 225 stores a current region identifier for the current region 140. In one embodiment, the tape data 200 may be written to the magnetic tape 105 before the magnetic tape 105 is dismounted from the tape drive 100. The tape data 200 may be written to a housekeeping data set (HKDS).

Figure 2B:
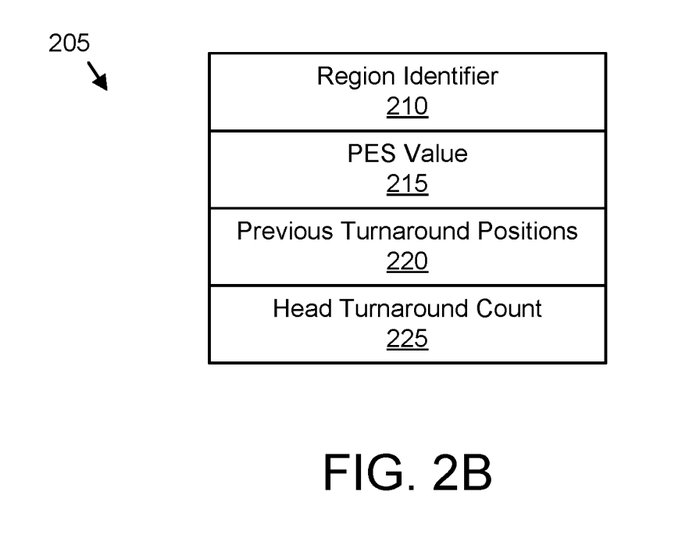
FIG. 2B is a schematic block diagram illustrating one embodiment of region data.

FIG. 2B is a schematic block diagram illustrating one embodiment of the region data 205. The region data 205 may be organized as a data structure in the memory. In the depicted embodiment, the region data 205 includes a region identifier 210 for a region 140, the PES value 215 for the region 140, one or more previous turnaround positions 220, and a head turnaround count 225.

In one embodiment, the region identifier 210 is an integer that uniquely identifies the region 140. The regions 140 may be sequentially assigned integer region identifiers 210.

The PES value 215 may be the PES value that is measured as the tape head 120 crosses a region boundary 145 for the region 140. Alternatively, the PES value 215 may be an average PES value as the tape head 120 passes over the region 140.

The previous turnaround positions 220 may record a number of all previous tape head turnarounds within the region 140. In one embodiment, locations of the previous turnaround positions 220 may be calculated from the number of tape head turnarounds. In addition, the previous turnaround positions 220 may locate each previous tape head turnaround position within the region 140.

The head turnaround count 225 may record a number of times that the magnetic tape 105 reversed the travel direction 155 with the tape head 120 within the region 140. In one embodiment, the head turnaround count 225 records a cumulative had turnaround count of all times that the magnetic tape 105 reversed the travel direction 155 with the tape head 120 within the region 140 since the initialization of the magnetic tape 105. Alternatively, the head turnaround count 225 may record a number of times that the magnetic tape 105 reversed the travel direction 155 with the tape head 120 within the region 140 since a specified event.

Figure 3A:
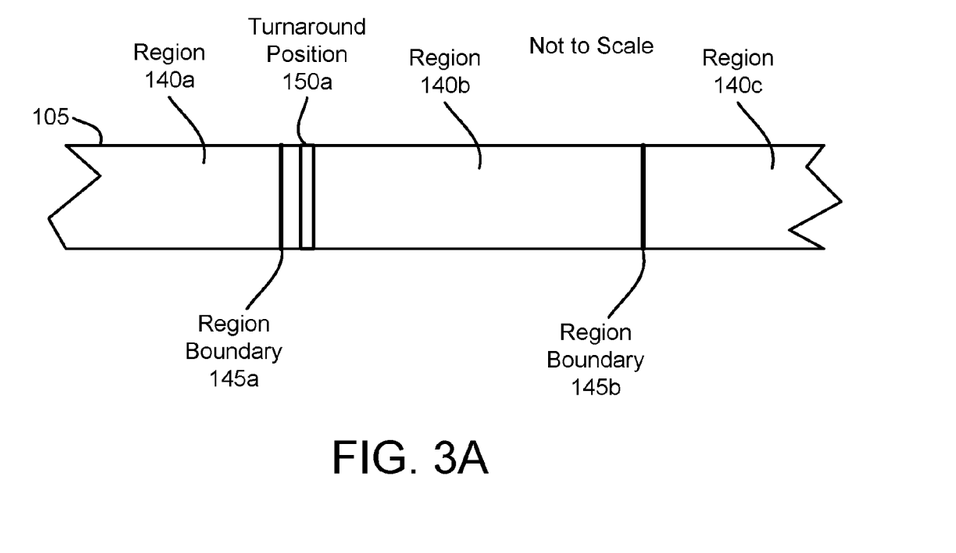
FIG. 3A is a drawing illustrating one embodiment of a magnetic tape with one turnaround position in a region.

FIG. 3A is a drawing illustrating one embodiment of a magnetic tape 105 with one turnaround position 150a in a region 140b. In the depicted embodiment, a given region 140b includes a turnaround position 150a that corresponds to a position of the tape head 120 when the travel direction 155 of the magnetic tape 105 was reversed. In one embodiment, when the travel direction 155 of the magnetic tape 105 was reversed, the head turnaround count 225 for the region 140b was incremented from zero to one and the location of the turnaround position 150a was recorded as a previous turnaround position 220. In addition, the number of previous tape head turnarounds may be incremented from zero to one.

Figure 3B:
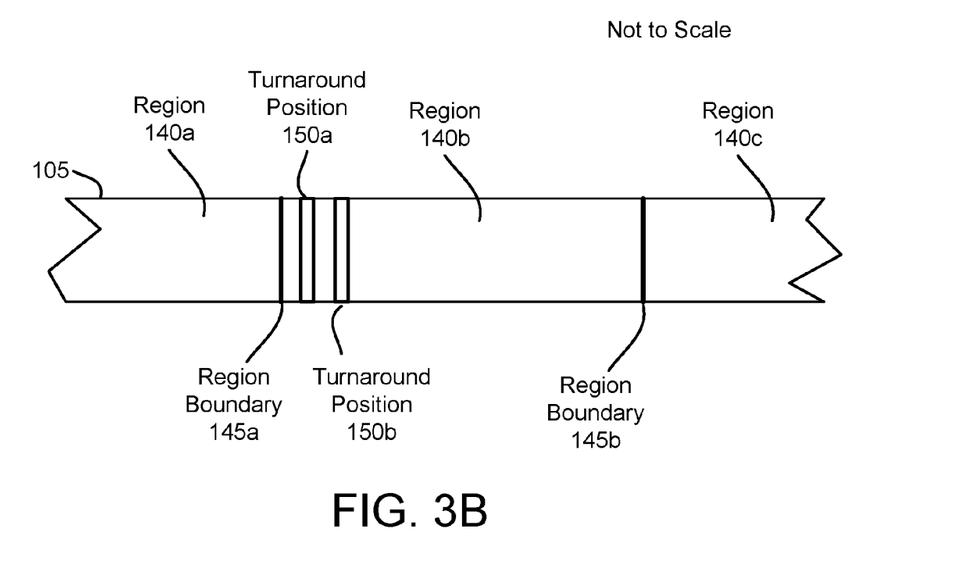
FIG. 3B is a drawing illustrating one embodiment of a magnetic tape with two turnaround positions in a region.

FIG. 3B is a drawing illustrating one embodiment of the magnetic tape 105 of FIG. 3A with two turnaround positions 150a/b in the region 140b. In the depicted embodiment, the travel direction 155 of the magnetic tape 105 was reversed with the tape head 120 at a second turnaround position 150b. In addition, the head turnaround count 225 for the region 140b may be incremented from one to two and the location of the second turnaround position 150b may be recorded as a previous turnaround position 220. In addition, the number of previous tape head turnarounds may be incremented from one to two.

Figure 3C:
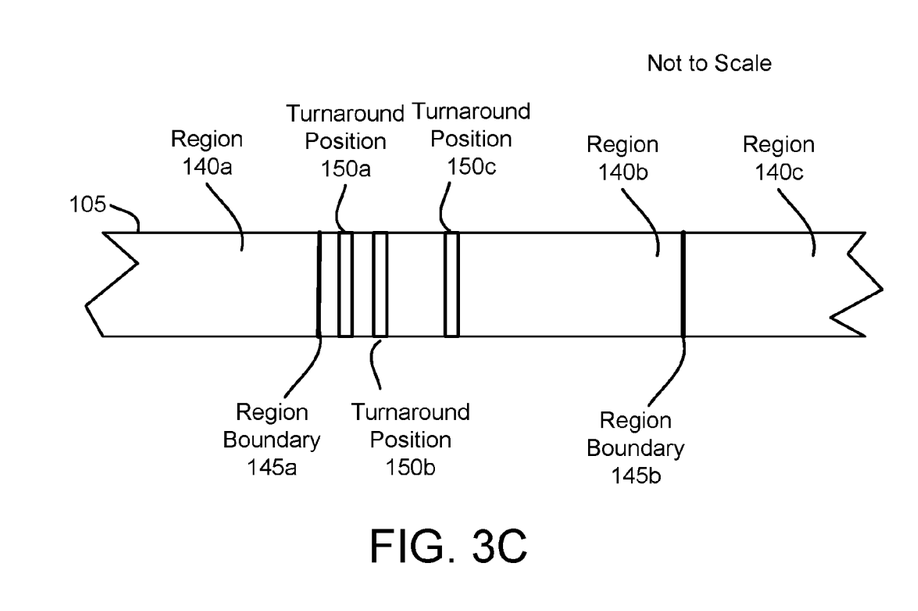
FIG. 3C is a drawing illustrating one embodiment of a magnetic tape with three turnaround positions in a region.

FIG. 3C is a drawing illustrating one embodiment of the magnetic tape 105 of FIG. 3B with three turnaround positions 150a/b/c in the region 140b. In the depicted embodiment, the travel direction 155 of the magnetic tape 105 was reversed with the tape head 120 at a third turnaround position 150c. In addition, the head turnaround count 225 for the region 140b may be incremented from two to three and the location of the third turnaround position 150c may be recorded as a previous turnaround position 220. In addition, the number of previous tape head turnarounds may be incremented from two to three.

Figure 4:
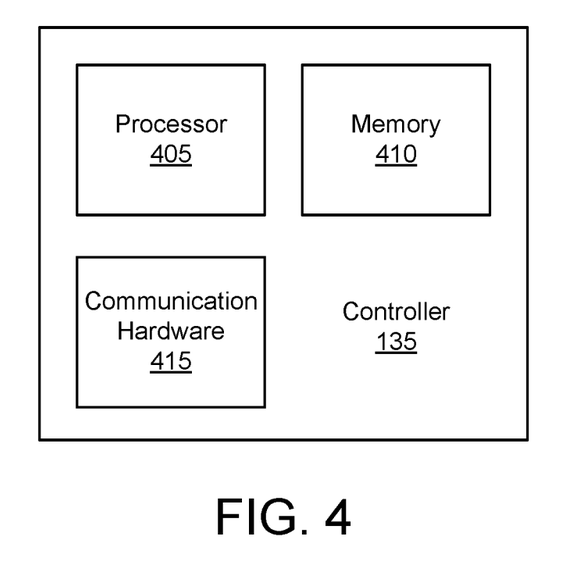
FIG. 4 is a schematic block diagram illustrating one embodiment of a controller.

FIG. 4 is a schematic block diagram illustrating one embodiment of the controller 135. In the depicted embodiment, the controller 135 includes a processor 405, a memory 410, and communication hardware 415. The memory 410 may comprise a semiconductor storage device, a hard disk drive, a micromechanical storage device, an optical storage device, or combinations thereof. The memory 410 may store code. The processor 405 may execute the code. The communication hardware 415 may communicate with other devices such as the write channel 115, the read channel 125, the tape head 120, the servos 110, and/or the hall sensors 130.

Figure 5A:
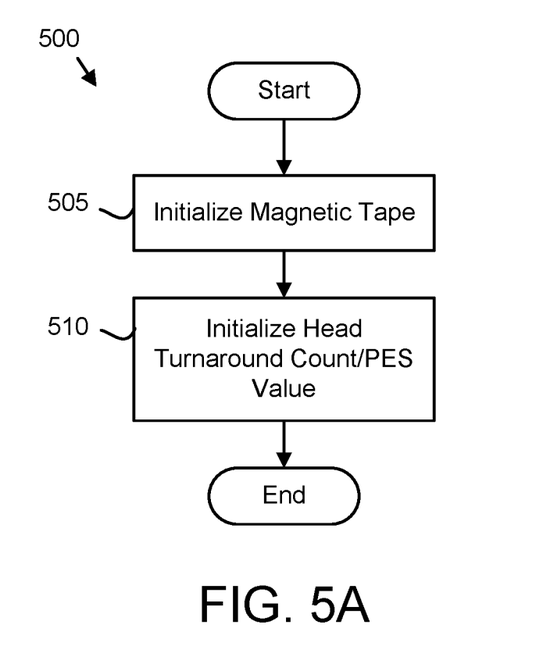
FIG. 5A is a schematic flow chart diagram illustrating one embodiment of a tape initialization method.

FIG. 5A is a schematic flow chart diagram illustrating one embodiment of a tape initialization method 500. The method 500 may initialize the magnetic tape 105. The method 500 may be performed by the tape drive 100, the controller 135 and/or the processor 405 of the controller 135.

The method 500 starts, and in one embodiment, the processor 405 initializes 505 the magnetic tape 105. In one embodiment, the processor 405 may initialize 535 the magnetic tape 105 by formatting the regions 140 and the region boundaries 145.

The processor 405 further initializes 510 the head turnaround count 225 and the PES value 215 and the method 500 ends. The head turnaround count 225 may be initialized 510 to zero. In addition, the PES value 215 may be initialized to zero. Alternatively, the PES value 215 may be initialized to a first calculated PES value 215.

Figure 5B:
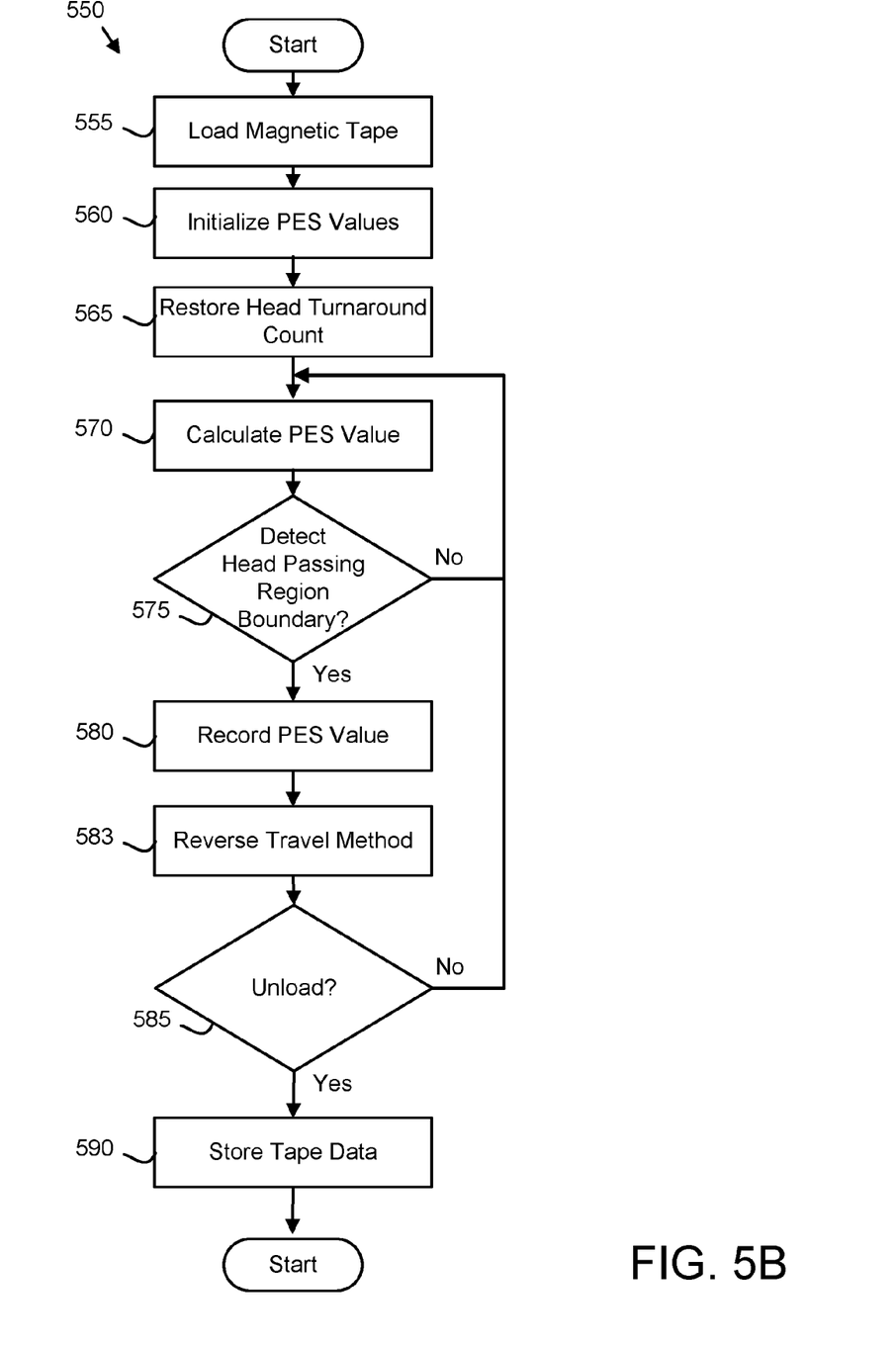
FIG. 5B is a schematic flow chart diagram illustrating one embodiment of a tape operation method.

FIG. 5B is a schematic flow chart diagram illustrating one embodiment of a tape operation method 550. The method 550 may operate the tape drive 100, loading the magnetic tape 105, reading data from the magnetic tape 105, and/or writing data to the magnetic tape 105. The method 550 may be performed by the tape drive 100, the controller 135 and/or the processor 405 of the controller 135.

The method 550 starts, and in one embodiment, the processor 405 loads 555 the magnetic tape 105. In addition, the processor 405 may initialize 560 the PES values 215. The PES values 215 may be initialized 560 to zero. Alternatively, the PES values 215 may be initialized to a first measured value of the PES.

The processor 405 may restore 565 the head turnaround count 225 from the magnetic tape 105. In one embodiment, the processor 405 reads the head turnaround count 225 from the HKDS. The head turnaround count 225 for each region 140 may be a cumulative head turnaround count of each turnaround position 150 within the region 140 since the initialization of the magnetic tape 105.

The processor 405 may calculate 570 the PES value as the tape head 120 flies over the magnetic tape 105. The processor 405 may further detect 575 the tape head 120 passing a region boundary 145. If the processor 405 does not detect 575 the tape head 120 passing the region boundary 145, the processor 405 continues to calculate 570 the PES value.

If the processor 405 detects 575 the tape head 120 passing the region boundary 145, the processor 405 may record 580 the PES value 215 to the region data 205. The PES value 215 for each region 140 may be recorded each time the tape head 120 passes the region 140.

The processor 405 may further perform the reverse travel method 583 if required to reverse the travel direction 155. The reverse travel method 583 is described in more detail in FIG. 5C.

The processor 405 determines 585 whether to unload the magnetic tape 105. If the magnetic tape 105 is not to be unloaded, the processor 405 continues to calculate 570 the PES value. If the magnetic tape 105 is to be unloaded, the processor 405 stores 590 the tape data 200 to the magnetic tape 105 and the method 550 ends. As a result, each head turnaround count 225 and previous turnaround positions 220 are stored in the region data 205 on the magnetic tape 105 and are available when the magnetic tape 105 is again loaded on a tape drive 100.

Figure 5C:
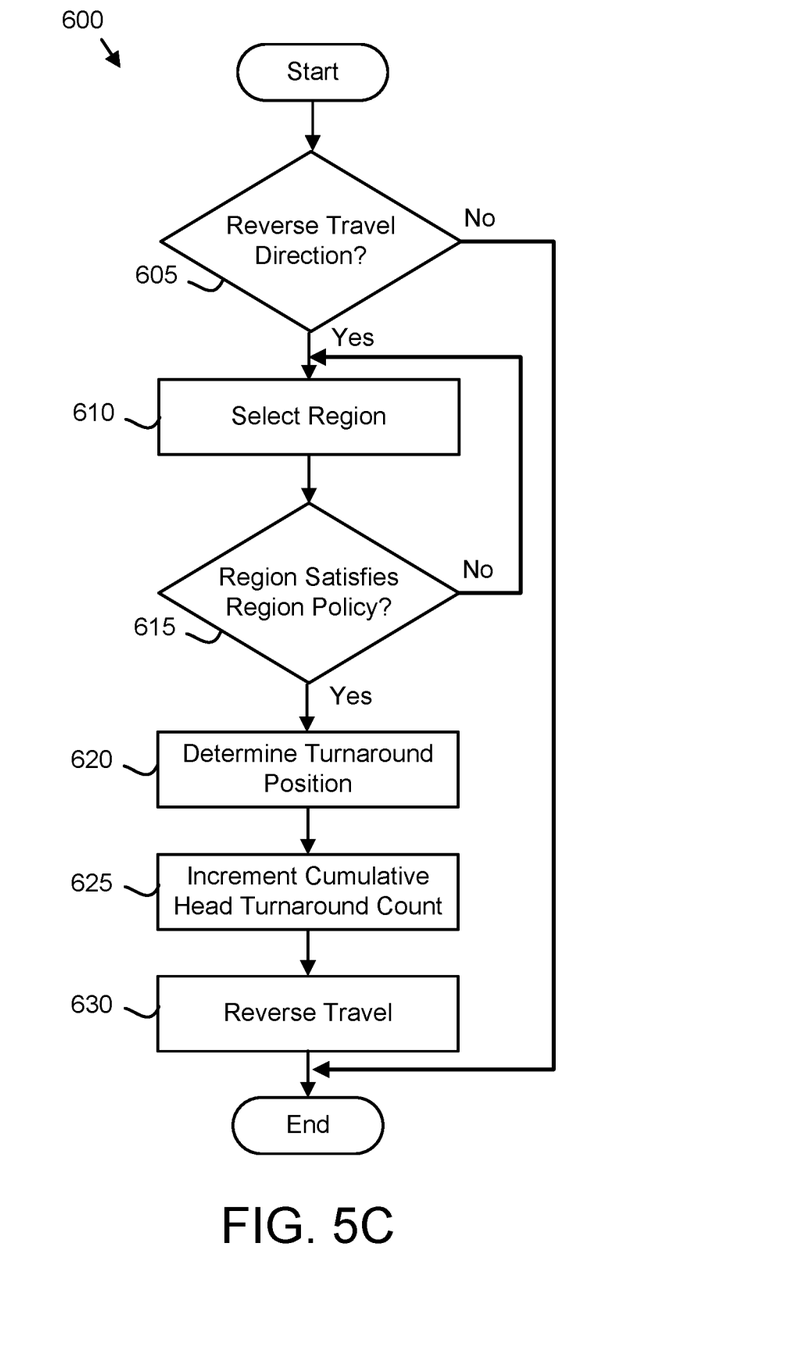
FIG. 5C is a schematic flow chart diagram illustrating one embodiment of a reverse travel method.

FIG. 5C is a schematic flow chart diagram illustrating one embodiment of a reverse travel method 600. The method 600 may reverse the travel direction 155 of the magnetic tape 105 while avoiding accumulation of debris on the magnetic tape 105. The method 600 may perform step 583 of FIG. 5B. The method 600 may be performed by the tape drive 100, the processor 405 and/or the processor 405 of the controller 135.

The method 600 starts, and in one embodiment, the processor 405 determines 605 whether to reverse the travel direction 155 of the magnetic tape 105. If the processor 405 determines 605 not to reverse the travel direction 155, the method 600 ends.

If the processor 405 determines 605 to reverse the travel direction 155, the processor 405 selects 610 a first region 140 where the tape head 120 will be located when reversing the travel direction 155. In one embodiment, the selected region 140 is located immediately adjacent to another region 140 where the tape head 120 will begin to read and/or write data. Alternatively, the selected region 140 may be located within a specified number of regions of the other region 140 where the tape head 120 will begin to read and/or write data.

The processor 405 determines 615 if the selected region 140 satisfies a region policy. In one embodiment, the selected region 140 satisfies the region policy if either the PES value 215 for the selected region 140 does not exceed a PES threshold or if the cumulative head turnaround count 225 for the selected region 140 does not exceed a count threshold.

If the region policy is not satisfied such as if both the PES value 215 for the selected region 140 exceeds the PES threshold and if the cumulative head turnaround count 225 for the selected region 140 exceeds the count threshold, the processor 405 selects 610 a second region 140 as the selected region 140. The second region 140 may be adjacent to the first region 140. Alternatively, the second region 140 may be a region 140 within a selection interval of the first region 140 with a lowest PES value 215 and a lowest cumulative head turnaround count 225. In one embodiment, the selection interval is between two and five regions 140.

If the region policy is satisfied such as if either both the PES value 215 for the selected region 140 does not exceed the PES threshold or if the cumulative head turnaround count 225 for the selected region 140 does not exceed the count threshold, the processor 405 determine 620 a turnaround position 150 within the selected region 140. The processor 405 may determine 620 the turnaround position 150 within the selected region 140 as a function of the head turnaround count 225 for the selected region 140. The head turnaround count 225 may be the cumulative head turnaround count 225. In one embodiment, if the head turnaround count 225 is zero, the turnaround position 150 may be located in a specified initial position relative to a region boundary 145.

In a certain embodiment, the turnaround position P 150 is determined 620 using Equation 1, where P0 is the initial position relative to the region boundary 145, TC is the head turnaround count 225, and f is a function of the head turnaround count 225.

$$P = P0 + f(TC) \qquad \text{Equation 1}$$

Alternatively, the turnaround position 150 may be determined at a position within the selected region 140 that is not within the separation interval of previous turnaround positions 140.

The processor 405 may increment 625 the head turnaround count 225. The head turnaround count 225 for each region 140 may be incremented each time the magnetic tape 105 is reversed with the tape head 120 within the region 140.

The processor 405 may further reverse 630 the travel direction 155 with the tape head 120 within the selected region 140 and the method 600 ends. As a result, the embodiments reverse 630 the travel direction 155 with the tape head 120 within a region 140 and at the turnaround position 150 that avoids the excessive accumulation of debris within the region 140 and/or at the turnaround position 150. As a result, the performance of the magnetic tape 105 is improved as the turnaround positions 150 are distributed throughout the magnetic tape 105.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a processor;
  a memory storing code executable by the processor to perform:
    recording a position error signal (PES) value and cumulative head turnaround count for each region of a plurality of regions of a magnetic tape;
    selecting a first region in which to reverse travel of the magnetic tape relative to a tape head;
    in response to determining one of the PES value for the first region does not exceed a PES threshold and the cumulative head turnaround count for the first region does not exceed a count threshold, reversing travel of the magnetic tape at the first region and determining a turnaround position within the first region as a function of the cumulative head turnaround count for the first region; and
    in response to determining the PES value for the first region exceeds the PES threshold and the cumulative head turnaround count for the first region exceeds the count threshold, selecting a second region at which to reverse travel of the magnetic tape.

2. The apparatus of claim 1, the processor further determining a turnaround position within the first region that is not within a separation interval of previous turnaround positions.

3. The apparatus of claim 1, wherein the second region is adjacent the first region.

4. The apparatus of claim 1, wherein the second region is a region within a selection interval of the first region with one of a lowest PES value and a lowest cumulative head turnaround count.

5. The apparatus of claim 1, wherein the PES value for each region is recorded each time the tape head passes the region.

6. The apparatus of claim 1, wherein the cumulative head turnaround count for each region is incremented each time the magnetic tape is reversed with the tape head within the region.

7. The apparatus of claim 1, wherein the PES value is a PES standard deviation.

8. A method for controlling a tape drive head comprising:
  recording, by use of a processor, a position error signal (PES) value and cumulative head turnaround count for each region of a plurality of regions of a magnetic tape;
  selecting a first region in which to reverse travel of the magnetic tape relative to a tape head;
  in response to determining one of the PES value for the first region does not exceed a PES threshold and the cumulative head turnaround count for the first region does not exceed a count threshold, reversing travel of the magnetic tape at the first region and determining a turnaround position within the first region as a function of the cumulative head turnaround count for the first region; and
  in response to determining the PES value for the first region exceeds the PES threshold and the cumulative head turnaround count for the first region exceeds the count threshold, selecting a second region at which to reverse travel of the magnetic tape.

9. The method of claim 8, the method further comprising determining a turnaround position within the first region that is not within a separation interval of previous turnaround positions.

10. The method of claim 8, wherein the second region is adjacent the first region.

11. The method of claim 8, wherein the second region is a region within a selection interval of the first region with one of a lowest PES value and a lowest cumulative head turnaround count.

12. The method of claim 8, wherein the PES value for each region is recorded each time the tape head passes the region.

13. The method of claim 8, wherein the cumulative head turnaround count for each region is incremented each time the magnetic tape is reversed with the tape head within the region.

14. The method of claim 8, wherein the PES value is a PES standard deviation.

15. A computer program product for avoiding debris accumulation, the computer program product comprising a computer readable storage medium having program instructions embodied therewith, the program instructions readable/executable by a processor to cause the processor to:

record a position error signal (PES) value and cumulative head turnaround count for each region of a plurality of regions of a magnetic tape;

select a first region in which to reverse travel of the magnetic tape relative to a tape head;

in response to determining one of the PES value for the first region does not exceed a PES threshold and the cumulative head turnaround count for the first region does not exceed a count threshold, reverse travel of the magnetic tape at the first region and determining a turnaround position within the first region as a function of the cumulative head turnaround count for the first region; and in response to determining the PES value for the first region exceeds the PES threshold and the cumulative head turnaround count for the first region exceeds the count threshold, select a second region at which to reverse travel of the magnetic tape.

16. The computer program product of claim 15, the processor further determining a turnaround position within the first region that is not within a separation interval of previous turnaround positions.

17. The computer program product of claim 15, wherein the cumulative head turnaround count for each region is incremented each time the magnetic tape is reversed with the tape head within the region.

* * * * *